United States Patent [19]

Smolik

[11] 4,384,396
[45] May 24, 1983

[54] APPARATUS AND METHOD FOR USE IN INSTALLATION OF A RECEPTACLE BOX

[76] Inventor: Robert A. Smolik, 670 W. Seventh St., St. Paul, Minn. 55102

[21] Appl. No.: 215,797

[22] Filed: Dec. 12, 1980

[51] Int. Cl.³ .......................................... B23Q 17/00
[52] U.S. Cl. ...................................... 29/407; 29/445; 29/526 R; 33/180 R; 33/DIG. 10; 144/123
[58] Field of Search ..................... 29/407, 526 R, 445; 33/DIG. 1, DIG. 10, 180 R; 144/323

[56] References Cited

U.S. PATENT DOCUMENTS

| | | | |
|---|---|---|---|
| 2,775,812 | 1/1957 | Mohr | 29/407 |
| 3,722,360 | 3/1973 | Blakely | 33/180 R X |
| 3,733,707 | 5/1973 | Nix | 30/180 R |
| 3,884,280 | 5/1975 | Chailer | 33/DIG. 10 X |
| 4,059,905 | 11/1977 | Wieting | 33/180 R |
| 4,087,913 | 5/1978 | Jackson | 33/DIG. 10 X |
| 4,202,388 | 5/1980 | Wieting | 33/180 R X |

Primary Examiner—Charlie T. Moon
Attorney, Agent, or Firm—Burd, Bartz & Gutenkauf

[57] ABSTRACT

An apparatus and method for use in the installation of an electrical receptacle box and in particular for use in cutting an access opening in wallboard installed in covering relationship to the electrical receptacle box. During wall installation, a guide plate is attached to an electrical receptacle box fixed to a wall stud and having a front opening in substantially flush relationship to the front surface of the wall stud. The guide plate carries first locating means and has outer peripheral side edges substantially coinscidential with the forward edges of the sidewalls of the electrical receptacle box defining the front opening. With wallboard installed in covering relationship to the wall stud and the electrical receptacle box so as to conceal them, a second locating means is used to locate the first locating means. The first and second locating means can be first and second magnets having opposite polarity. With the second locating means, the position of the first locating means is determined and thus for the location of the guide plate. A cutting tool is used to form a hole in the wallboard at a location where it intercepts the guide plate. The cutting tool is then moved to a guide edge provided by the guide plate which can be the outer peripheral side edge of the guide plate or a forwardly facing continuous uninterrupted groove formed in the forward surface of the guide plate. The tool then follows the guiding edge along a closed path until a portion of wallboard is cut out to provide access opening to the electrical receptacle box.

23 Claims, 9 Drawing Figures

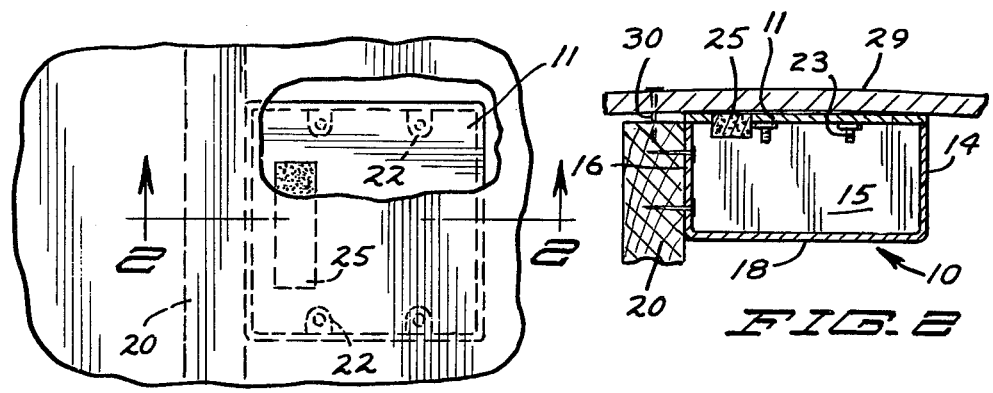
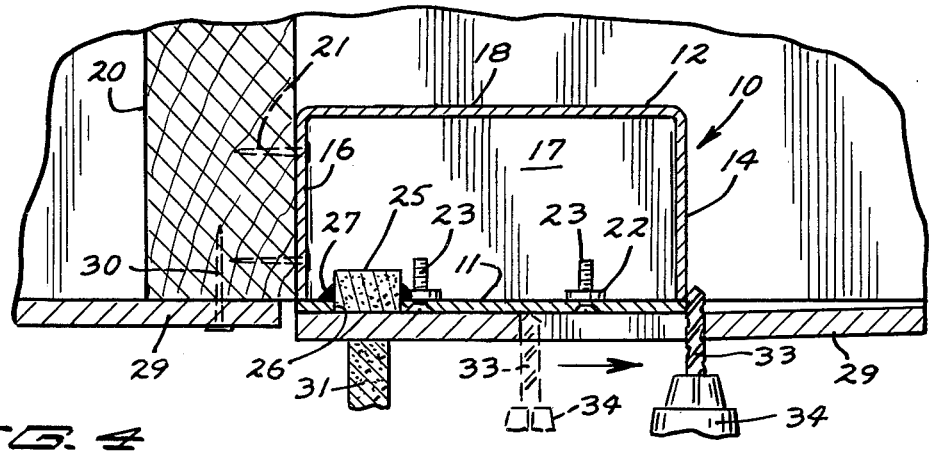
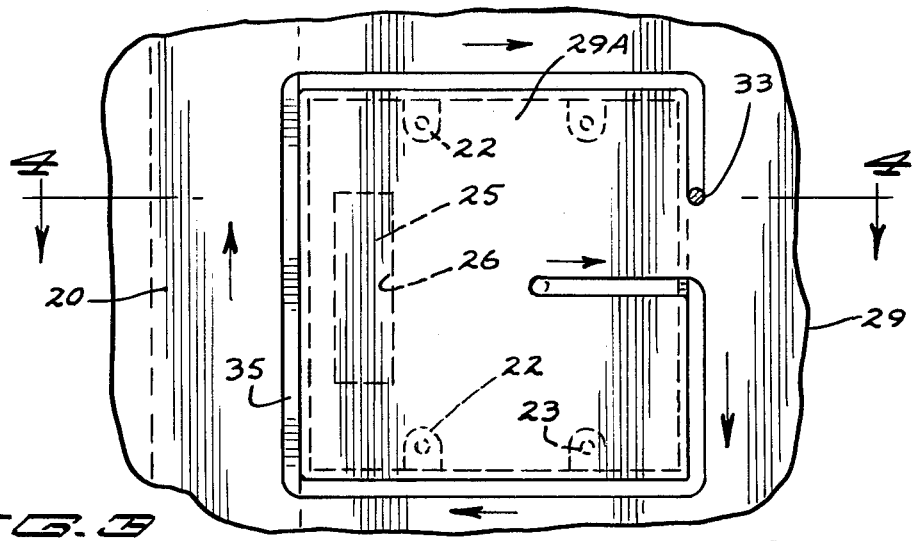
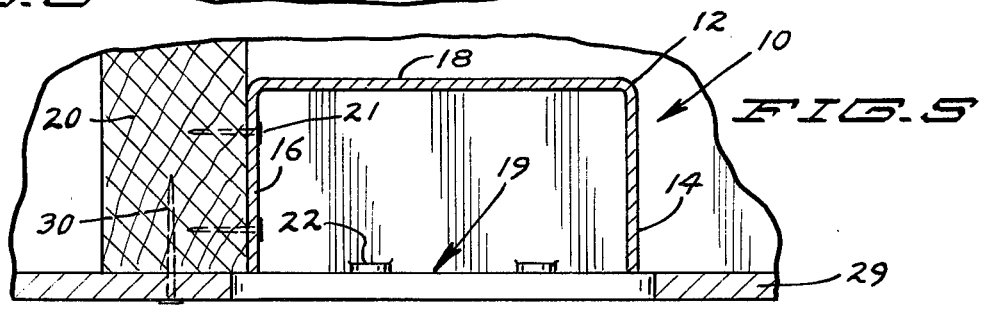

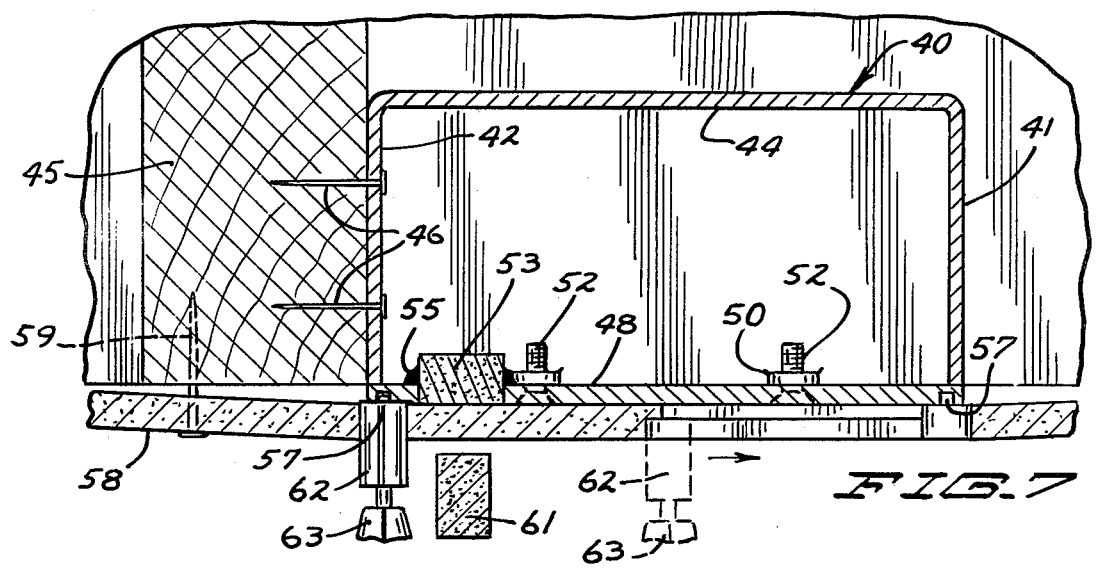
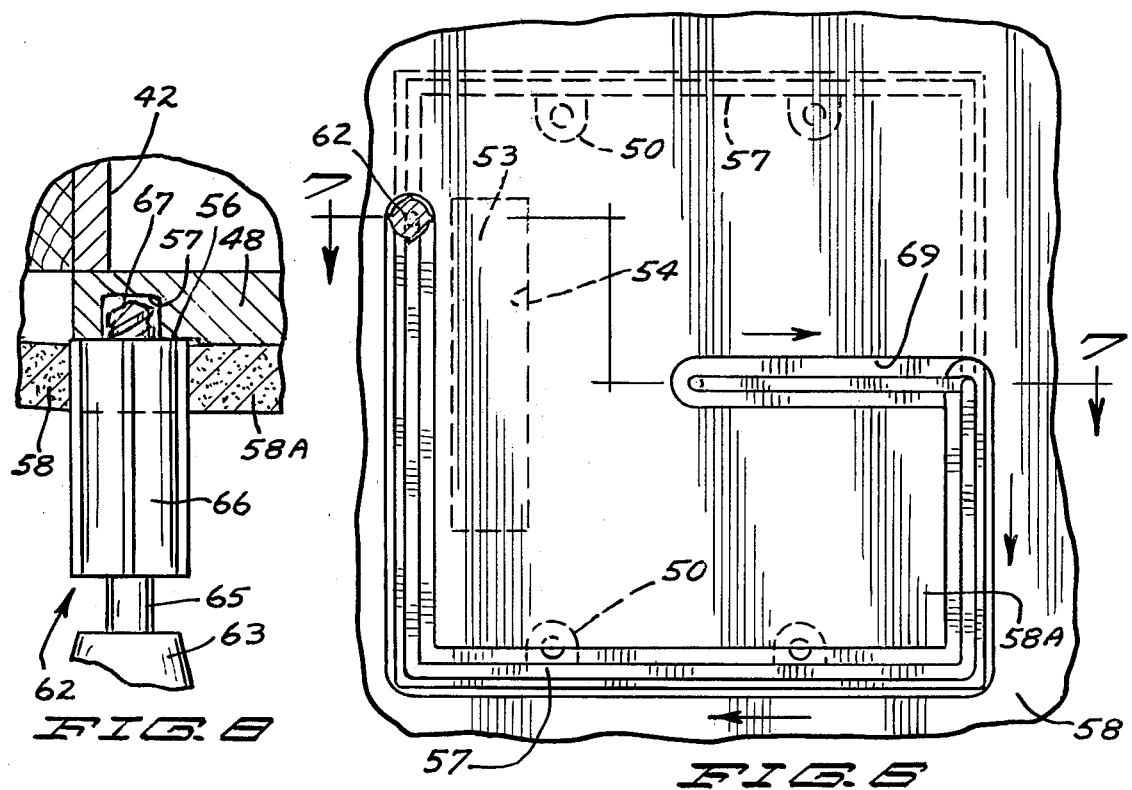
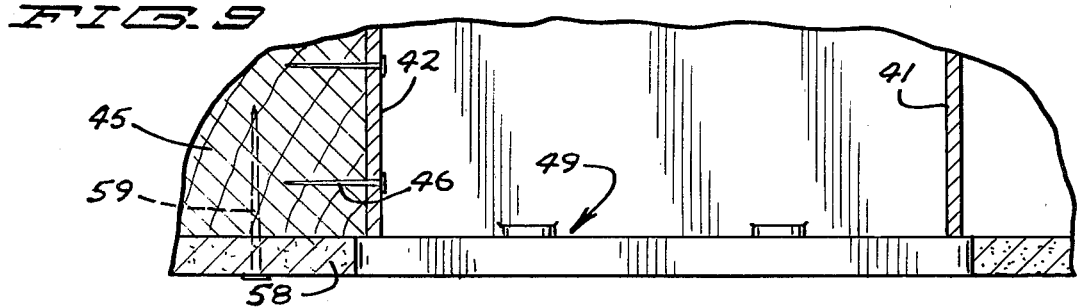

4,384,396

APPARATUS AND METHOD FOR USE IN INSTALLATION OF A RECEPTACLE BOX

SUMMARY OF THE INVENTION

The invention pertains to an apparatus and method for installation of an electrical receptacle box and in particular to an apparatus and method for forming an access opening in wallboard installed over a receptacle box corresponding to the front opening of the box to permit mounting of electrical equipment such as a switch or the like. In the prior art a receptacle box is fixed to a stud during wall construction. Drywall, plasterboard, paneling or other forms of wallboard is installed with respect to the stud to form a wall. A hole must be formed in the wallboard at the location of the receptacle box of corresponding dimensions to those of the front opening of the receptacble box. This requires accurate and time consuming measurement. If the hole is deviant from the opening of the receptacle box, it must be repaired for the sake of appearance.

The apparatus and method of the invention provides means to locate the front face of an electrical box once it has been installed on a stud and covered by wallboard, and then means to cut an opening for access to the box which opening accurately corresponds to the front opening of the electrical box. The invention includes a plate having a flat forward face installed on the front of an electrical receptacle box mounted on a wall stud. In one form of the invention, the outer peripheral edges of the plate correspond to the outer peripheral edges of the electrical box. The plate can carry a first locating means such as a first magnet. The plate is installed on the box using the conventional fittings located on the box for installation of an electrical receptacle. Wallboard is then installed in the usual fashion in covering relationship to the electrical receptacle box and closely adjacent the plate mounted thereon. With the wallboard so installed, the electrical receptacle box is out of view. A second locating means such as a second magnet having polarity opposite to the first magnet is then used to locate the first locating means and thus locate the plate. A rotatable cutting tool having side cutting faces such as a routing tool mounted in a portable electric hand drill is used to drill a hole through the wallboard at a position where it will strike the plate. The cutting tool is then moved across the surface of the plate to an outer peripheral side edge of the plate which corresponds to an outer peripheral edge of the electrical box. At the point where the cutting tool drops off the edge of the plate, it is held in side surface contact with the edge of the plate as it is moved along the outer peripheral side edge of the plate. The tool is moved until the entire plate has been circumscribed thus to cut out a portion of the wallboard corresponding to the plate and the front opening of the electrical receptacle box. The exposed plate is then removed from the electrical receptacle box where upon the electrical receptacle can be installed therein. The usual face plate can then be installed over the electrical receptacle. In another form of the invention, the plate is provided with a forwardly directed groove which accommodates a portion of the cutting tool to guide it along the periphery of the plate and cut out a portion of the wallboard corresponding to the front opening of the electrical receptacle box.

IN THE DRAWINGS

FIG. 1 is a front elevational view of an electrical receptacle box fixed to a wall stud with a guide plate installed thereon and covered by wallboard with a portion removed for purposes of illustration;

FIG. 2 is a sectional view of the electrical receptacle box of FIG. 1 taken along the line 2—2 thereon;

FIG. 3 is an enlarged front elevational view like that of FIG. 1 showing the apparatus and method of the invention operative to form an opening in the wallboard corresponding to the front opening of the electrical receptacle box;

FIG. 4 is a sectional view of the electrical receptacle box and apparatus of the invention of FIG. 3 taken along the line 4—4 thereof;

FIG. 5 is a sectional view like that of FIG. 4 showing that portion of the wallboard removed corresponding to the front opening of the electrical receptacle box;

FIG. 6 is a front elevational view of the apparatus and method according to a second form of the invention operative to form an opening in wallboard corresponding to the front opening of an electrical receptacle box;

FIG. 7 is a sectional view of the apparatus and electrical receptacle box of FIG. 6 taken along the line 7—7 thereof;

FIG. 8 is an enlarged view of a portion of the apparatus of FIG. 7; and

FIG. 9 is a sectional view of the electrical receptacle box like that of FIG. 7 showing that portion of wallboard removed corresponding to the front opening of the electrical receptacle box preparatory to installation of electrical equipment.

DESCRIPTION OF PREFERRED EMBODIMENT

Referring to the drawings, there shown in FIGS. 1 through 4 an electrical receptacle box 10 having a guide plate 11 according to the invention installed thereon. Electrical receptacle box 10 includes a box like housing 12 comprised of perpendicularly orientated sidewalls 14, 15, 16, 17 connected to a back wall 18. Housing 12 has a planar front opening indicated at 19 in FIG. 5. Housing 12 is fixed to a vertical wall stud 20 by usual and preferred means such as nails 21 passing through suitable openings provided in one sidewall 16 and into the stud 20 to position the front opening 19 of housing 12 in generally flush relationship with the front surface of wall stud 20.

Guide plate 11 is installed in covering relationship to front opening 19 of housing 12 defined by the forward facing edges of walls 14-17. Electrical receptacle box 10 is of a standard configuration having cantilevered mounting ears 22 with threaded openings extending from opposite sidewalls 15, 17 inwardly of front opening 19 for mounting electrical receptacles or the like. Threaded flathead bolts 23 pass through countersunk openings in plate 11 aligned with the mounting ears 22 and are threaded into the openings of the mounting ears 22 to securely hold plate 11 with respect to receptacle box 10. Outer peripheral side edges of plate 11 generally coincide with the forward edges of sidewalls 14-17.

Plate 11 carries a first locating means comprised as a first magnet 25. Plate 11 is preferably a hard, non-magnetic material such as stainless steel or hard plastic. Magnet 25 is mounted in an opening 26 in plate 11 set off center of plate 11 toward stud 20. Magnet 25 has a flat forward surface in generally flush relationship with the exposed flat forward surface of plate 11. Magnet 25 is held in position in opening 26 by a suitable adhesive or coating as an epoxy coating 27 adhering between the inward surfaces of magnet 25 and the inside surface of plate 11. As shown, magnet 25 is comprised as a ceramic magnet for purposes of durability and high magnetism.

As shown in FIGS. 1 and 2, wallboard such as plasterboard 29 is installed as with nails 30 to the wall stud 20 and the next adjacent wall studs (not shown). As shown in FIG. 2, wallboard 29 deflects slightly in the vicinity of plate 11 which extends slightly beyond the outer forward surface of stud 20. This is permitted by the resiliency of the wallboard material. With the wallboard 29 so installed, receptacle box 10 and guide plate 11 are out of view to a workman who intends to cut a hole in the wallboard corresponding to the front opening of box 10 for mounting electrical equipment.

In order to locate the position of the receptacle box hidden from forward view, the workman uses a second locating means shown in FIG. 4 to be comprised as a second magnet 31 having polarity opposite to that of the first magnet 25. Manually holding the second magnet 31, with the magnet the workman scans the surface of the wallboard in the proximity where he believes the receptacle box tend to be located. As the second magnet 31 nears the location of the first magnet 25, it is drawn closer to it, to a location where the magnetic force between the first and second magnet is the strongest. At this location, the workman has precisely located the first magnet 25 which he knows to be slightly off center of plate 11.

Having located the first magnet and the guide plate 11, thus knowing the location of receptacle box 10, the workman uses a drilling tool having side cutting edges to form an opening in wallboard 20 corresponding to the front opening 19 of receptacle box 10. As shown in FIG. 4, the workman can use a routing bit 33 having side cutting edges mounted in the jaws 34 of a portable electric hand drill (not shown).

As indicated in phantom in FIG. 4, with the rotating tool 33 the workman bores a hole through the wallboard 29 at a location where he knows the tool will intercept plate 11. Having intercepted plate 11, the tool is moved laterally toward the edge of plate 11 cutting the wallboard as it moves. When the tool reaches the side edge of the plate the workman is alerted by inward movement of the tool. Having reached the side edge of the plate 11, the workman then traces along the side edge of the plate making a cut 35 shown in FIG. 3 corresponding to the outer perimeter of plate 11. Upon completely tracing the outer perimeter of plate 11, the circumscribed piece of wallboard 29A covering the plate 11 is removed. Plate 11 is then removed from receptacle box 10 by removal of bolts 23. As shown in FIG. 5, receptacle box 10 is then ready for mounting of electrical equipment in usual fashion then to be covered by a face plate. The opening formed in the wallboard 29 accurately corresponds to the opening 19 of receptacle box 10.

A second form of the invention is shown in FIGS. 6 through 9 where there is provided an electrical receptacle box 40 having perpendicularly orientated sidewalls including sidewalls 41, 42 shown in FIG. 7 connected to a back wall 44. Receptacle box 40 is fastened to an upright wall stud 45 by usual means such as nails 46 passing through one of the sidewalls 42 and securing the sidewall 42 closely adjacent the side surface of the wall stud 45 with the front opening of the receptacle box indicated at 49 in FIG. 9 being generally in flush relationship with the front surface of the wall stud 45. A guide plate 48 covers the front opening 49 and has outer peripheral edges that closely correspond to the outer edges of the sidewalls of receptacle box 40.

Electrical receptacle box 40 has cantilevered mounting ears 50 extending inwardly of opening 49 at the forward edges of the sidewalls for mounting electrical equipment. Threaded flathead bolts 52 pass through countersunk openings in plate 48 aligned with the mounting ears 50 and are threaded into openings in the mounting ears 50 to securely hold plate 48 with respect to receptacle box 40.

Plate 48 carries a first locating means comprised as a first magnet 53. Magnet 53 is mounted in an opening 54 in plate 48 set off center of plate 48 toward stud 45. Magnet 53 has a flat forward surface in generally flush relationship with the exposed flat forward surface of plate 48. Magnet 53 is held in position in opening 54 by suitable adhesive or coating as an epoxy coating 53 adhering between the inward surfaces of magnet 53 and the inside surface of plate 48.

Plate 48 is generally flat and is shaped to just cover front opening 49 of receptacle box 40 and the corresponding forward edges of the sidewalls of box 40. Plate 48 has a slight peripheral recess indicated at 56 in FIG. 8 located on the forward surface thereof adjacent the side edges and extending continuously along the side edges. An outwardly facing continuous uninterrupted tool guiding groove 57 is formed on the front surface of plate 48 by a pair of continuous parallel uninterrupted edges defining a shape of the intended shape of a piece of wallboard to be cut out to provide an access opening to box 40. Groove 57 is located in recess 56 and is parallel to and spaced slightly in from the outer edges of plate 48 for accommodation of a portion of a cutting tool.

Wallboard 58 is installed on stud 45 and adjacent studs (not shown) as with the use of nails 59 so as to be in covering relationship to guide plate 48 and receptacle box 40 and conceal them whereby a workman must locate plate 48 and form an acess opening in wallboard 58 corresponding to front opening 49 of receptacle box 40.

With the wallboard so installed, the workman uses a second locating means comprised as a second magnet 61 having opposite polarity to that of first magnet 53 to locate the first magnet 53 and thus determine the position of guide plate 48. With the second magnet 61, the workman scans the area where he believes the plate 48 is to be located until he notes the strong magnetic attraction of first magnet 53 whereby he has located the first magnet 53 and knows the location of the remainder of guide plate 48.

Having located plate 48, the workman uses a rotating cutting tool 62 mounted in the jaws 63 of a portable electric drill (not shown) to form a hole in wallboard 58 at a location where it covers plate 48. As shown in FIG. 8, tool 62 has a shank 65 mounted in the jaws 63, an enlarged body portion 66 having side cutting faces, and a reduced tip 67 having a face for drilling or boring. As shown in FIG. 6, having formed a hole in the wallboard 58 at a location where it covers the plate 48, the workman moves the tool laterally, cutting the wallboard as it is moved. When the tool moves to the location of the groove 57, the reduced top 67 of tool 62 drops into the groove 57. Groove 57 is of a dimension slightly larger than the diameter of the tip 67 of tool 62. With the tip 67 so engaged in the groove 57, the workman simply follows the groove along the perimeter of plate 48, the tool being guided by the edges of the groove. As the tool moves, the side cutting faces of the body portion 66 form a cut 69 in the wallboard which corresponds to the edges of plate 48 and edges of receptacle box 40. The forward shoulder of body portion 66 occupies recess 56. The purpose of recess 56 is to permit sufficient penetration by body portion 66 of tool 62 to insure that wallboard 58 is cut completely through. Having traced the groove 57 continuously around the perimeter of plate 48, a portion 58A of wallboard 48 is cut out corresponding closely to the front opening 49 of receptacle box 40. The diameter of body portion 66 and tool 62 is such that with the top 67 engaged in the groove 57, the outer perimeter of the body 66 is closely aligned with the outer edge of the plate 48 and receptacle box 42 whereby the opening formed in the wallboard 58 very closely corresponds to the dimensions of the plate 48 and outer dimensions of receptacle box 40. As shown in FIG. 9, the cut out portion 58A is simply removed leaving an opening in wallboard 58 closely corresponding to the front opening 49 of receptacle box 40.

In terms of a method, an electrical receptacle box is installed on a wall stud and has a front opening in substantially flush relationship with the front surface of the wall stud. A guide plate is installed in covering relationship to the electrical receptacle box and has outer peripheral dimensions substantially coincident with those of the electrical receptacle box and carrying a first locating means. Wallboard is installed over the wall stud and the electrical receptacle box. A second locating means is used to locate the first locating means. A cutting tool having a side cutting face is used to drill a hole in the wallboard at a location where it will intercept the guide plate located by the second locating means. The cutting tool is then moved laterally to a position where it intercepts a tool guiding edge of the guide plate which can be formed of the outer peripheral side edge of the guide plate or an outwardly facing groove formed in the guide plate and shaped in the shape of the intended access opening to be formed in the wallboard. The cutting tool is then moved along the guide edge of the plate until the desired portion of wallboard has been cut out to provide an access opening. The plate is then removed so that electrical equipment can be installed in the electrical receptacle box.

While there has been shown and described certain preferred embodiments of the invention, it will be apparent that certain deviations may be had from the embodiment shown without departing from the scope and spirit of the invention.

The embodiments of the invention in which an exclusive property or privilege is claimed are defined as follows:

1. An apparatus for use in installing a receptacle box secured to a wall stud to form an access hole in wallboard installed in covering relationship to the receptacle box comprising:
    a plate having a generally flat forward face;
    means for mounting said plate on said receptacle box with said forward face of the plate facing away from the electrical receptacle box and facing toward the location of installation of wallboard;
    said plate having a continuous uninterrupted tool guiding edge means defining a shape corresponding to the intended shape of an access opening to be formed in the wallboard for access to the electrical receptacle box;
    said plate carrying a first non-wallboard penetrating locating means;
    second non-wallboard penetrating locating means remote from the plate movable about wallboard installed in covering relationship to said receptacle box with said plate mounted thereon in the general vicinity of the plate and having non-wallboard penetrating means to detect the location of the first locating means upon said movement in the general vicinity of the plate.

2. The apparatus of claim 1 wherein:
    said tool guiding edge means is comprised as outer peripheral side edges of the plate.

3. An apparatus for use in installing a receptacle box secured to a wall stud to form an access hole in wallboard installed in covering relationship to the receptacle box comprising:
    a plate having a generally flat forward face;
    means for mounting said plate on said receptacle box with said forward face of the plate away from the electrical receptacle box and facing toward the location of installation of wallboard;
    said plate having a continuous uninterrupted tool guiding edge means comprised as a continuous groove formed in the forward surface of the plate parallel to and spaced inwardly from the outer peripheral side edges of the plate defining a shape corresponding to the intended shape of an access opening to be formed in the wallboard for access to the electrical receptacle box;
    said plate carrying the first locating means; and
    second locating means remote from the plate and having means to detect the location of the first locating means.

4. The apparatus of claim 1, 2 or 3 wherein: said first locating means comprises a magnet.

5. The apparatus of claim 1, 2 or 3 wherein: said second locating means comprises a magnet.

6. An apparatus for use in installing a receptacle box secured to a wall stud to form an access hole in wallboard installed in covering relationship to the receptacle box comprising:
    a plate having a generally flat forward face;
    means for mounting said plate on said receptacle box with said forward face of the plate facing away from the electrical receptacle box and facing toward the location of installation of wallboard;
    said plate having a continuous uninterrupted tool guiding edge means defining a shape corresponding to the intended shape of an access opening to be formed in the wallboard for access to the electrical receptacle box;
    said plate carrying first locating means comprised as a first magnet; and
    second locating means remote from the plate and having means to detect the location of the first locating means comprised as a second magnet of opposite polarity to the first magnet.

7. The apparatus of claim 1 or 3 wherein said receptacle box is of the type having sidewalls with forward edges defining a forward front opening and installable on a wall stud during wall construction with said front opening facing the intended location of wallboard to be installed on the wall stud and generally in coplanar relationship with the forward surface of the wall stud, wherein:
    said means to mount the plate on the receptacle box comprises means to mount the plate in covering relationship to the front opening of the receptacle box, said plate having outer peripheral side edges generally corresponding to the shape of the front opening of the receptacle box and the forward edges of the sidewalls defining the front opening of the receptacle box.

8. The apparatus of claim 1 wherein:
said tool guiding edge means is comprised as a continuous groove formed in the forward surface of the plate parallel to and spaced inwardly from the outer peripheral side edges of the plate.

9. The apparatus of claim 1, 8 or 2 wherein:
said first locating means comprises a magnet.

10. The apparatus of claim 9 wherein:
said plate has an opening, said magnet being installed in and secured in said opening and having a flat forward surface in generally flush relationship with the flat forward surface of the plate.

11. The apparatus of claim 1, 8 or 2 wherein:
said second locating means comprises a magnet.

12. The apparatus of claim 1, 8 or 2 wherein:
said first locating means comprises first magnet and said second locating means comprises a second magnet of opposite polarity to the first magnet.

13. The apparatus of claim 12 wherein:
said plate has an opening, said first magnet being installed in and secured in said opening and having a flat forward surface in generally flush relationship with the flat forward surface of the plate.

14. The apparatus of claim 8 wherein:
said plate has a recess located on the forward surface adjacent the side edges thereof, said groove being formed in said recess.

15. The apparatus of claim 14 wherein:
said first locating means comprises a magnet.

16. The apparatus of claim 14 wherein:
said plate has an opening, said magnet being installed in and secured in said opening and having a flat forward surface in generally flush relationship with the flat forward surface of the plate.

17. The apparatus of claim 14 wherein:
said first locating means comprises first magnet and said second locating means comprises a second magnet of opposite polarity to the first magnet.

18. The apparatus of claim 17 wherein:
said plate has an opening, said first magnet being installed in and secured in said opening and having a flat forward surface in generally flush relationship with the flat forward surface of the plate.

19. The apparatus of claim 8 or 14 including:
a rotating cutting tool having a body portion with side cutting edges for cutting said wallboard, and a reduced tip with a drilling face extended from the body portion, said reduced tip being insertable in said groove for guided movement of the tool as the body portion cuts the wallboard.

20. The apparatus of claim 6 wherein:
said tool guiding edge means is comprised as a continuous groove formed in the forward surface of the plate parallel to and spaced inwardly from the outer peripheral side edges of the plate.

21. The apparatus of claim 20 wherein:
said plate has a recess located on the forward surface adjacent the side edges thereof, said groove being formed in said recess.

22. A method of providing an access hole in wallboard installed in covering relationship to receptacle box installed on a wall stud with sidewalls having forward edges defining a forward opening in substantially flush relationship with a forward surface of the wall stud, comprising the steps of:
installing a guide plate having a generally flat forward face, a first non-wallboard penetrating locating means and a tool guiding edge having a continuous uninterrupted closed path on the receptacle box in covering relationship to the front opening and the forward edges of the sidewalls defining the front opening;
installing wallboard over the wall stud and electrical receptacle box;
using a movable second non-wallboard penetrating locating means having means to detect the location of the first locating means upon movement over the wallboard in the general vicinity of the plate to locate the position of the first locating means and the guide plate; and
using a cutting tool having a side cutting surface to cut through the wallboard at a location to intercept the guide plate, and then moving the cutting tool to the tool guiding edge of the guide plate and following the guiding edge of the guide plate around said continuous uninterrupted closed path until a piece of wallboard has been cut out corresponding to the intended access opening to the receptacle box.

23. The method of claim 22 wherein:
the step of installing a guide plate on the receptacle box having a first locating means includes the step of installing a guide plate having a first magnet on the receptacle box, and the step of using a second locating means to locate the position of the first locating means comprises using a second magnet of opposite polarity to the first magnet to locate the position of the first magnet.

* * * * *